US008317291B2

(12) United States Patent
Mizes et al.

(10) Patent No.: US 8,317,291 B2
(45) Date of Patent: Nov. 27, 2012

(54) SYSTEM AND METHOD FOR ATTENUATING ROTATING MEMBER CONTAMINATION AFFECTING UNIFORMITY MEASUREMENTS IN AN INKJET IMAGING DEVICE

(75) Inventors: Howard A. Mizes, Pittsford, NY (US); Yeqing Zhang, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 590 days.

(21) Appl. No.: 12/621,356

(22) Filed: Nov. 18, 2009

(65) Prior Publication Data

US 2011/0116123 A1 May 19, 2011

(51) Int. Cl.
*B41J 29/393* (2006.01)

(52) U.S. Cl. ........................................ 347/19

(58) Field of Classification Search .................... 347/19
See application file for complete search history.

(56) References Cited

U.S. PATENT DOCUMENTS 5,345,863 A 9/1994 Kurata et al.
5,389,958 A 2/1995 Bui et al.
5,406,315 A 4/1995 Allen et al.
5,528,361 A * 6/1996 Sakata .......................... 358/296
5,774,155 A 6/1998 Medin et al.
5,777,650 A 7/1998 Blank
5,793,398 A 8/1998 Hennig
6,113,231 A 9/2000 Burr et al.
6,196,675 B1 3/2001 Deily et al.
6,361,230 B1 3/2002 Crystal et al.
6,485,140 B1 11/2002 Lidke et al.
6,494,570 B1 12/2002 Snyder
7,040,733 B2 * 5/2006 Hin ................................ 347/19
2007/0097159 A1 * 5/2007 Bastani ............................ 347/5
2009/0040261 A1 2/2009 Zhang et al.

FOREIGN PATENT DOCUMENTS

JP 2004-320331 * 11/2004

* cited by examiner

*Primary Examiner* — Julian Huffman
(74) *Attorney, Agent, or Firm* — Maginot, Moore & Beck, LLP

(57) ABSTRACT

A method enables an inkjet printing system to attenuate image noise in an image of a test strip obtained as print media bearing the test strip travels over a roller in the printing system. The method includes illuminating blank media as the media travels over a rotating member, generating electrical signals corresponding to light reflected by the blank media as the blank media travels over the rotating member, converting the electrical signals to image data of the blank media, printing a test strip on media, illuminating the media as the media on which the test strip is printed travels over the rotating member, generating electrical signals corresponding to light reflected by the media as the media on which the test strip is printed travels over the rotating member, converting the electrical signals to image data of the media on which the test strip is printed, modifying the image data of the media on which the test strip is printed with the image data of the blank media, and storing the modified image data in memory.

18 Claims, 4 Drawing Sheets

SYSTEM AND METHOD FOR ATTENUATING ROTATING MEMBER CONTAMINATION AFFECTING UNIFORMITY MEASUREMENTS IN AN INKJET IMAGING DEVICE

TECHNICAL FIELD

This disclosure relates generally to imaging devices that eject ink from ink jets onto image receiving members to form images and, more particularly, to imaging devices that eject ink directly onto print media.

BACKGROUND

An ink jet printer produces images on an image receiving member by ejecting ink droplets onto the member as the member moves past a print head. The advantages of non-impact, low noise, low energy use, and low cost operation are largely responsible for the wide acceptance of ink jet printers in the marketplace.

Ink jet printers, however, may produce undesirable image defects in a printed image. One such image defect is non-uniform print density, such as "banding" and "streaking." One major cause of "banding" and "streaking" is variation in the mass of the ink droplets ejected from different ink nozzles. These variations in ink mass may be caused by variations in the nozzles of a print head. The differences in the nozzles of a print head may be caused by deviations in the physical characteristics (e.g., the nozzle diameter, the channel width or length, etc.) or the electrical characteristics (e.g., thermal or mechanical activation power, etc.) of the nozzles. These variations are often introduced during print head manufacture and assembly.

The nozzles of a print head are typically arranged in arrays having rows and columns. Therefore, banding and/or streaking effects may occur in a horizontal or vertical line of an image. The variations in the ink drops that cause these defects relate to the density, size, or morphology of the ink drops that form an image. These variations can have a static (i.e., consistent) component and a random (i.e., non-consistent) component. Random variations between ink drops are generally less visible because their effects tend to cancel-out each other. The static variations are usually repeated more consistently and, thus, are more likely to be visible as banding or streaking defects.

Known techniques that adjust the driving signals of print heads to compensate for non-uniformity have been developed. Generally, these techniques involve a test pattern and/or patch being printed with one or more print heads and the test pattern and/or patch being imaged to obtain density measurements for the inkjet ejectors in the print heads. These density measurements are correlated to the individual inkjet ejectors in the print heads to enable a controller to adjust the firing signals used to actuate the inkjet ejectors. The controller modifies the firing signals for the inkjet ejectors to produce a more uniform density across the print heads. The technique is usually repeated until the density uniformity across a test pattern and/or patch does not vary from a target density by more than a predetermined threshold. Such adjustment techniques are typically known as print head normalization processes as the goal of the procedure is to normalize the inkjet ejectors to the target density.

The imaging of the test pattern and/or patch may be done in a variety of ways. In some printing systems, the media on which the test pattern and/or patch has been printed is removed from the printing system and placed in a scanner. The scanner typically moves an illumination source across the printed pattern and/or patch and optical sensors capture the response of the test pattern to the light. Darker areas cause the sensors to generate an electrical signal having a magnitude that is less than the magnitude of an electrical signal generated by a sensor receiving reflected light from a lighter area. Thus, the magnitude of the electrical signals may be used to identify the density or approximate drop mass of a droplet ejected by an inkjet ejector to form the test pattern and/or patch. The image generated by the scanner is processed by a computer to identify a drop mass for an inkjet ejector from the image pixel densities and to generate firing signal adjustments to normalize the inkjet ejectors. The firing signal adjustments may be stored in a memory and later downloaded into the printing system or transmitted over a network to the printing system.

In some printing systems, an illumination source and array of sensors are integrated within the printing system to image test patterns and/or patches generated by the printing system. These printing systems are able to generate test patterns and/or patches, capture images of the test patterns and/or patches with an inline sensor, and analyze the image data to measure the uniformity and determine firing signal adjustments to normalize the inkjet ejectors in a print head. These systems have the advantage of normalizing the inkjet ejectors without requiring an imaging and analysis system that is external to the printing system. Consequently, the control system for the printing system can obtain firing signal adjustments in situ.

In printing systems that are capable of imaging test patterns and/or patches within the system, the image environment affects the quality of the images. For example, the image receiving member has random structure that generates imaging noise in the imaging system. Likewise, surfaces that back or support the image receiving member may present structure that is transmitted through the image receiving member and captured in the test pattern image when the image receiving member is illuminated with light. Consequently, identifying image noise contributing structures and compensating the noise produced by the structure are worthwhile goals in printing systems that analyze test patterns and/or patches for inkjet ejector firing signal adjustments.

SUMMARY

A method enables an inkjet imaging device to identify and attenuate image noise in a test strip image that was contributed by a roller in an inkjet printing system that supports the image receiving media for the inline imaging system. The method includes illuminating blank media as the media travels over a rotating member, generating electrical signals corresponding to light reflected by the blank media as the blank media travels over the rotating member, converting the electrical signals to image data of the blank media, printing a test strip on media, illuminating the media as the media on which the test strip is printed travels over the rotating member, generating electrical signals corresponding to light reflected by the media as the media on which the test strip is printed travels over the rotating member, converting the electrical signals to image data of the media on which the test strip is printed, modifying the image data of the media on which the test strip is printed with the image data of the blank media, and storing the modified image data in memory.

An inkjet printing system includes an optical imaging system that measures image noise in blank media moving over a rotating member. The inkjet printing systems includes

BRIEF DESCRIPTION OF THE DRAWINGS

The foregoing aspects and other features of a printing system having an imaging system are explained in the following description, taken in connection with the accompanying drawings, wherein.

DETAILED DESCRIPTION

Figure 1:
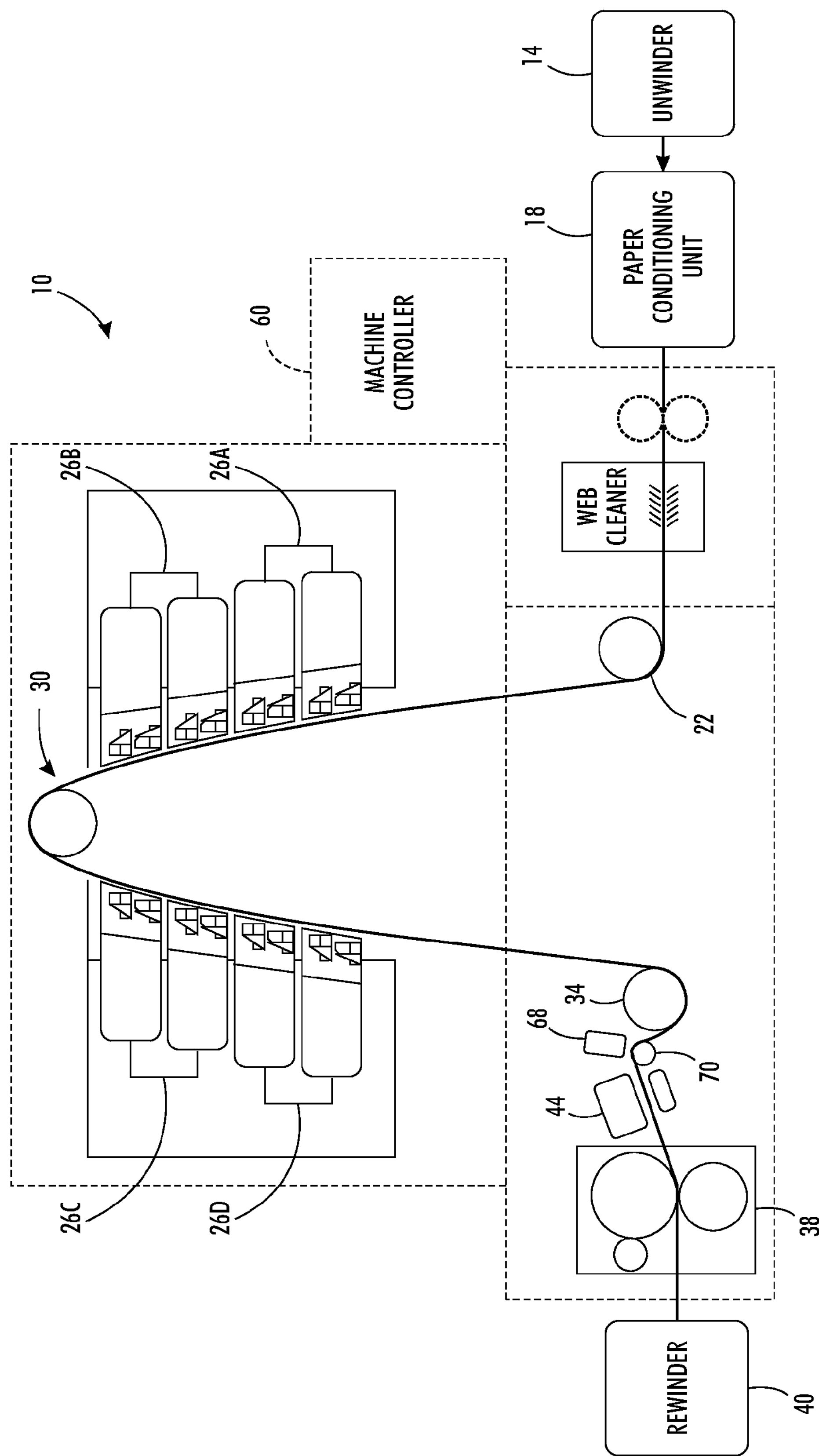
FIG. 1 is a schematic diagram of an inkjet printing system that attenuates image noise generated by a roller from test pattern images used to adjust inkjet ejector firing signals.

Referring to FIG. 1, a printing system that attenuates noise from a roller in images of a moving web of media material is shown. The system 10 includes a web unwinding unit 14, a media preparation station 18, a pre-heater roller 22, a plurality of marking stations 26, a turn roller 30, a leveling roller 34, and a spreader 38. In brief, the web unwinding unit 14 includes an actuator, such as an electrical motor, that rotates a web of media material in a direction that removes media material from the web. The media material is fed through the media preparation station 18 along a path formed by the pre-heater roller 22, turn roller 30, and leveling roller 34 and then through the spreader 38 to a rewinder 40. The media preparation station 18 removes debris and loose particulate matter from the web surface to be printed and the pre-heater roller 22 is heated to a temperature that transfers sufficient heat to the media material for optimal ink reception on the web surface as it passes the marking stations 26. Each of the marking stations 26A, 26B, 26C, and 26D in FIG. 1 includes two staggered full width print head arrays, each of which has three or four print heads that eject ink onto the web surface. The different marking stations eject different colored inks onto the web to form a composite colored image. In one system, the marking stations eject cyan, magenta, yellow, and black ink for forming composite colored images. The surface of the web receiving ink does not encounter a roller until it contacts the leveling roller 34. Leveling roller 34 modifies the temperature of the web and reduces any temperature differences between inked and non-inked portions of the web. After the temperature leveling the ink is heated by heater 44 before the printed web enters the spreader 38. The spreader 38 applies pressure to the ejected ink on the surface of the web to smooth the roughly semicircular ink drops on the surface of the web and to encourage ink fill with the different colors and present a more uniform image to a viewer. The web material is then wound around the rewinding unit 40 for movement to another system for further processing of the printed web.

This system 10 also includes two load sensors, one of which is mounted at a position near pre-heater roller 22 and the other is mounted at a position near the turn roller 30. These load sensors generate signals corresponding to the tension on the web proximate the position of the load sensor. Each of the rollers 22, 30, and 34 has an encoder mounted near the surface of the roller. These encoders may be mechanical or electronic devices that measure the angular velocity of a roller monitored by the encoder, which generates a signal corresponding to the angular velocity of the roller. In a known manner, the signal corresponding to the angular velocity measured by an encoder is provided to the controller 60, which converts the angular velocity to a linear web velocity. The linear web velocity may also be adjusted by the controller 60 with reference to the tension measurement signals generated by the load sensors. The controller 60 is configured with I/O circuitry, memory, programmed instructions, and other electronic components to implement a double reflex printing system that generates the firing signals for the printheads in the marking stations 26. A double reflex printing process is described in U.S. patent application Ser. No. 11/605,735 entitled "Double Reflex Printing" and published as U.S. Publication Number 2008/0125158 and commonly owned by the assignee of the present document. The term "controller" or "processor" as used in this document refers to a combination of electronic circuitry and software that generates electrical signals that control a portion or all of a process or system.

The system 10 also includes an optical imaging system 68. The optical imaging system may be implemented with an image-on-web array (IOWA) sensor 68 that generates an image of a portion of the web as the web passes the imaging system. The IOWA sensor 68 may be implemented with a plurality of optical detectors that are arranged in a single or multiple row array that extends across at least a portion of the web to be printed. The detectors generate signals having an intensity corresponding to a light reflected off the web. The light is generated by a light source that is incorporated in the IOWA sensor and directed toward the web surface to illuminate the surface as it passes the optical detectors of the IOWA sensor. The intensity of the reflected light is dependent upon the amount of light absorbed by the ink on the surface, the light scattered by the web structure, and the light reflected by the ink and web surface. The image signal generated by the IOWA sensor is processed by an integrated registration color controller (IRCC) to detect the presence, position, and intensity of ink drops ejected onto the surface of the web at the IOWA sensor.

As noted above, the controller 60 uses the tension measurements from the two load sensors along with the angular velocity measurements from encoders to compute linear web velocities at the rollers 22, 30, and 34. These linear velocities enable the processor to determine when a web portion printed by one marking station, station 26A, for example, is opposite another marking station, stations 26B, for example, so the second marking station can be operated by the controller 60 with firing signals to eject ink of a different color onto the web in proper registration with the ink already placed on the web by a previous marking station. When the subsequent marking station is operated too soon or too late, the ejected ink lands on the web at positions that may produce visual noise in the image. This effect is known as misregistration. Accurate measurements, therefore, are important in registration of different colored images on the web to produce images with little or no visual noise.

As shown in FIG. 1, a backer roller 70 is positioned opposite the optical imaging system 68. Although a roller is shown, other rotating members may also be used, such as a rotating endless belt or the like. To adjust the firing signals for inkjet ejectors in the print heads of the printing system, the controller 60 operates the print heads to eject ink in the form of a test pattern or patch onto the web. As used herein, a test pattern or patch printed on a web is defined as a test strip. In previously known printing systems, an image of a test strip is generated by the imaging system 68 and this image is processed by controller 60 or another processor operated by controller 60 to identify variations in the test strip that exceed threshold values for non-uniformity. The controller then adjusts the firing signals for the inkjet ejectors that ejected the ink corresponding to these identified variations and these modified firing signals are stored in the memory of the controller 60.

In some printing systems, test strip images were observed to have image noise that was contributed by the roller 70. Specifically, illuminating media bearing a test strip as the media traveled over the roller 70 resulting in roller structure showing through the media and affecting the test strip image. To reduce the image noise caused by the show through of roller structure in test strip images, a method for attenuating the roller structure noise was developed.

In order to attenuate the roller structure noise, the noise is first identified. Identification of roller structure noise may be achieved with the process shown in FIG. 2. As media on which no ink has been ejected is fed through the printing system, the imaging system generates multiple images of the media traveling over the roller 70 (block 204). The images capture each sector of the roller multiple times over different regions of the media as the roller rotates with the paper. Each image is correlated with a sector of the roller (block 208). Specifically, the roller 70 is divided into a plurality of sectors. In one embodiment, the length of a sector is set equal to the resolution of the imaging system in the process direction. For example, a rotating member with a ten inch circumference may be divided into ten sectors of one inch each because test strips are one inch long in the process direction. Thus, each sector of these ten sectors subtends an arc of thirty-six degrees. Each sector has a unique identifier that is associated with the images of blank media traveling over the sector.

The sector underlying a portion of media being imaged may be identified in a number of ways. In one embodiment, indicia, commonly known as fiducial marks, are positioned at intervals on the roller that correspond to the sectors. The media being imaged are narrower than the length of the roller. Consequently, the fiducial marks are located near the ends of the roller so they are not covered by the media traveling over the roller, but they still remain in the field of view of the imaging system. Each interval fiducial mark is unique to enable a sector to be identified from a test strip image. In another embodiment, a rotary encoder is coupled to the roller to generate an angular position signal corresponding to the rotation angle of the roller. This cyclical signal is correlated to an index position of the roller to identify the start of the roller. Thus, the angular position signal may be decoded with reference to the index position to identify a sector on the roller that underlies the media traveling over the roller.

The printing of a test strip is not necessarily synchronized with the sectors of the rotating member. In the embodiment discussed above, a one inch test strip may travel over the rotating member as the roller contacts the back of the media with portions of the two sectors that subtend the arc from fifteen degrees to fifty-one degrees of the three hundred and sixty degree circumference. Consequently, the mean average data for these two sectors are retrieved and the portion of the first sector subtending fifteen degrees to thirty-six degrees is extracted and concatenated with the portion of the second sector subtending thirty-six degrees to fifty-one degrees of the circumference. The concatenated sector is then used to modify the test strip image data.

Figure 2:
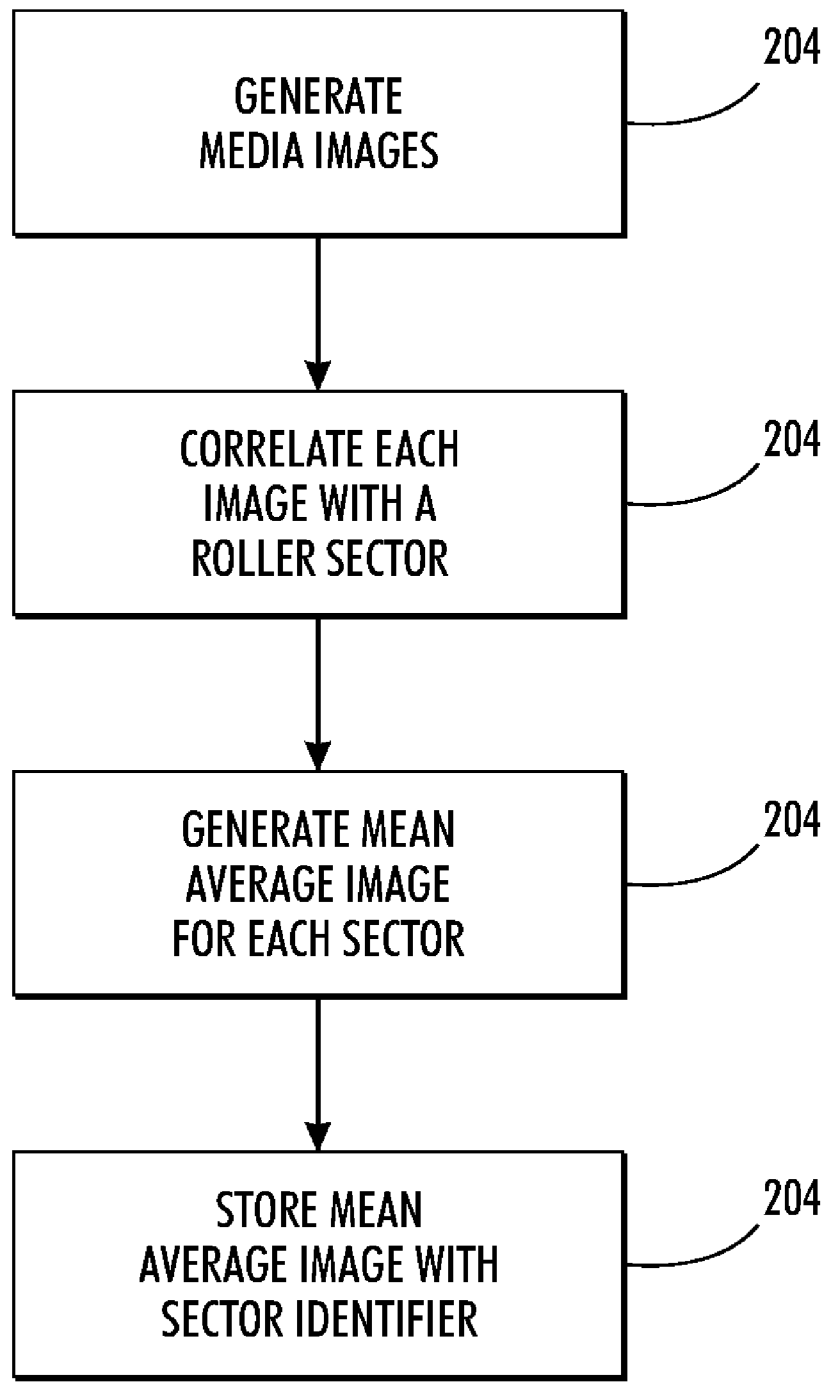
FIG. 2 is a flow diagram of a process for generating mean average images for sectors of a roller opposite an optical imaging system in the system of FIG. 1.

With continued reference to FIG. 2, the plurality of blank media images for each sector are mean averaged to generate a mean average image for each sector (block 212). A mean average image is then stored in memory in association with a sector identifier (block 216). By averaging the blank media images, noise associated with the structure of the paper and contaminants on the paper is reduced and the roller structure underlying the media as the media travels over the roller is more accurately captured.

Figure 3:
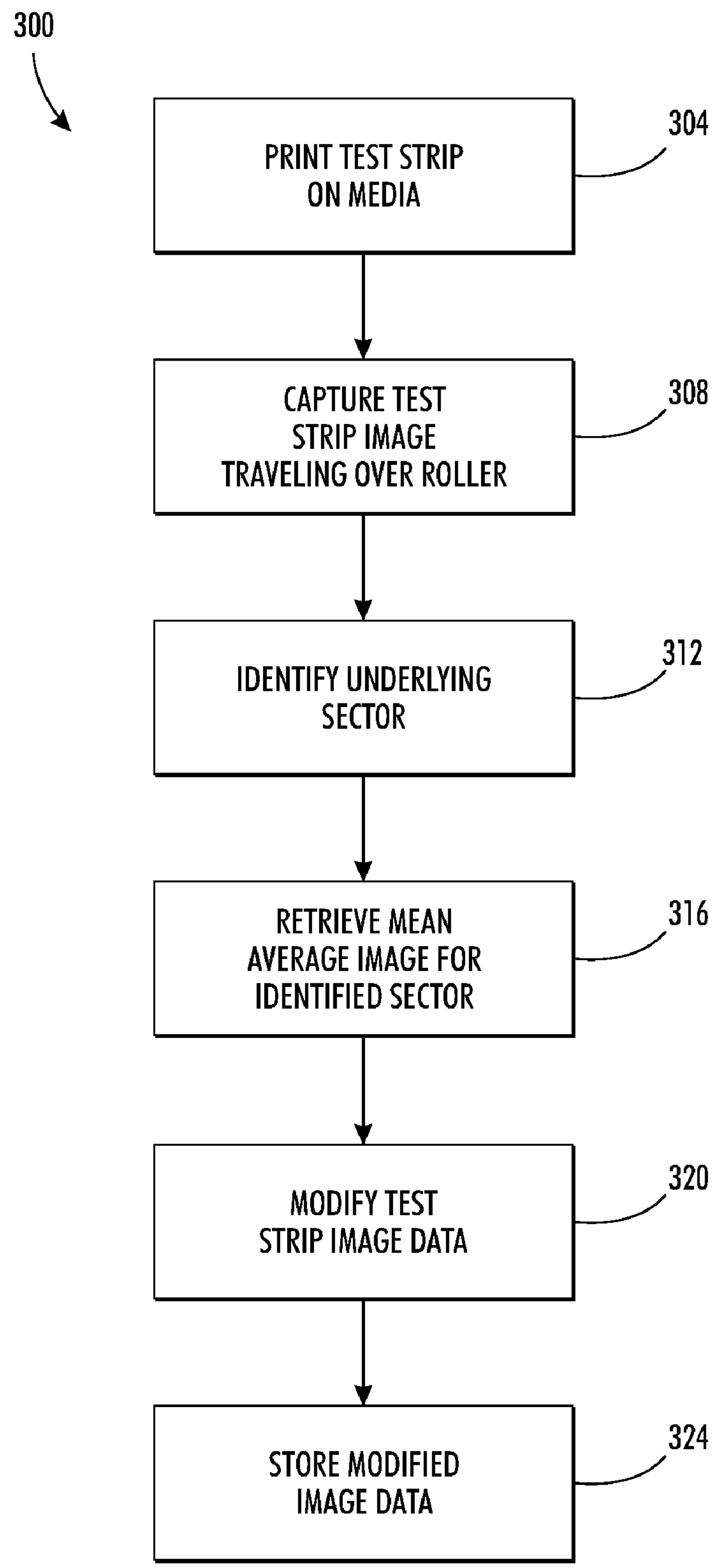
FIG. 3 is a flow diagram of a process for attenuating roller noise in test strip images using the mean average images generated by the process in FIG. 2.
Figure 4:
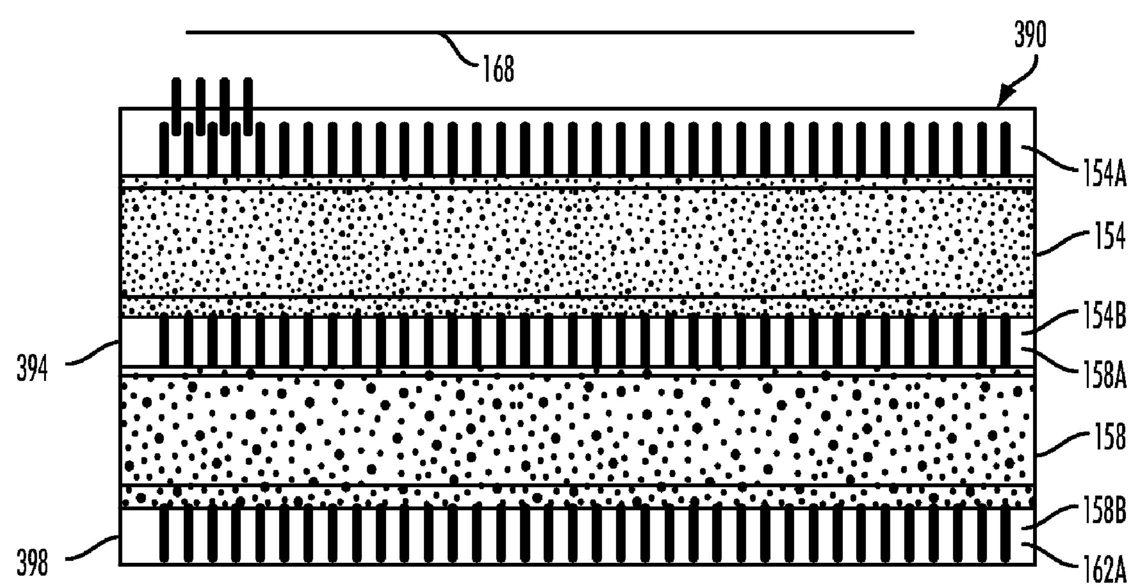
FIG. 4 is a depiction of an exemplary test pattern and patch printed for a test strip.

Once the mean average image for the sectors of a roller have been computed and stored, the process of FIG. 3 may be performed to attenuate noise in test strip images that arise from roller structure. The process 300 begins with the printing of a test strip on the media (block 304). An exemplary test strip is shown in FIG. 4. The top horizontal line 168 is used for line edge detection and skew angle computation. The fiducial regions of interest 390, 394, and 398 for the fiducial marks 154A, 154B, 158A, 158B, and 162A are identified using the height of the fiducial marks and the height of the solid fill strips. The strip regions of interest for the solid fill or halftoned strips are identified as the areas between the regions of interest for the fiducial marks. Once the regions of interest for the fiducial marks are identified, the fiducial marks are detected and their centers are identified. Regions of interest for each inkjet ejector may then be identified and the intensities in those regions of interest processed to identify the average intensity of ink jetted from each inkjet ejector. Those inkjet ejectors that are not ejecting ink or ejecting ink at an inappropriately low mass or reliability can be detected from this measurement.

Continuing with the process in FIG. 3, an image of the test strip is captured as the test strip travels over the rotating roller (block 308). The sectors underlying the media bearing the test strip are then identified (block 312) and the corresponding mean average image of the blank media for the identified sectors is retrieved from memory (block 316). Because the length of a test strip may cross a boundary between sectors of the rotating member, multiple sectors may underlie a test strip. Therefore, the mean averages stored for the multiple sectors are retrieved and portions of the mean average data concatenated for use in the processing of a test strip image. The test strip image data are modified (block 320) before the modified test strip image data are stored for analysis and generation of firing signal adjustments (block 324). The test strip image may be modified by computing the ratio of the test strip image data to the mean average image data. This modification attenuates the noise in the test strip image data that was caused by the blank media and rotating member structure underlying the media on which the test strip was printed.

During evaluations of the above-identified test strip image data modification process, different types of rollers were tested. Dark rollers do not change the show through reflection because dark rollers do not reflect light. Nevertheless, the reflected signal from dark rollers was observed to depend strongly on variations in media thickness. These variations add noise to the uniformity measurement. The reflected signals from white rollers are less sensitive to media thickness, but over time white rollers may become contaminated with ink and other printing debris. Contamination of white rollers may become especially apparent after many duplex printings as the roller surface is exposed to ink on the obverse side of the media after the printing of the reverse side. Thus, in printing systems where media of various thicknesses are used, white rollers provide more consistent images than dark rollers as long as the rollers are either cleaned or the image noise generated by a white roller having some degree of contamination is measured in the mean averages of blank media. Consequently, the mean average images for blank media associated with the roller sectors are computed after duplex printing runs or on a scheduled basis to identify and measure the show through noise of the roller.

In operation, a printing system is configured to identify the show through noise of a roller opposite the imaging system and then use the identified show through noise to modify test strip images that are used for firing signal modification. The system configuration includes installing programmed instructions in the printing system memory. These instructions are executed by the printing system controller or a processor within the system that communicates with the printing system controller. After the imaging system is operated to obtain multiple images of media without any ejected ink for each sector of the roller, a mean average image is computed for each sector and stored for later use. During the print head nozzle normalization process, test strips are printed on the media and images of the test strips are obtained with the imaging system. The image data for these test strip images are modified with the mean average image data of the blank media and the modified test strip image data are used to compute firing signal adjustments.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

We claim:

1. A method for generating test strip images in a printing system comprising:

illuminating blank media as the media travels over a rotating member;

generating electrical signals from light reflected by the blank media as the blank media travels over sectors of the rotating member;

converting the electrical signals to image data of the blank media as the blank media travels over the sectors of the rotating member;

computing a mean average image for each sector of the rotating member from the image data for the blank media that traveled over each sector of the rotating member;

storing each mean average image in a memory in association with a sector identifier;

printing a test strip on media;

illuminating the media as the media on which the test strip is printed travels over the rotating member;

generating electrical signals corresponding to light reflected by the media as the media on which the test strip is printed travels over the rotating member;

converting the electrical signals to image data of the media on which the test strip is printed;

modifying the image data of the media on which the test strip is printed with the image data of the blank media; and storing the modified image data in the memory.

2. The method of claim 1, further comprising:

identifying a sector over which the test strip traveled as the media on which the test strip is printed is illuminated;

retrieving the mean average image that was stored in the memory in association with the sector identifier that corresponds to the sector identified as the sector over which the test strip traveled; and modifying the image data for the media on which the test strip is printed with the retrieved mean average image.

3. The method of claim 2, the modification of the image data further comprising:

computing a ratio of the image data for the media on which the test strip is printed to the retrieved mean average image.

4. The method of claim 3, the sector identification further comprising:

detecting indicia positioned at intervals on the rotating member.

5. The method of claim 3, the sector identification further comprising:

receiving an encoder signal from a rotary encoder coupled to the roller; and decoding the encoder signal with reference to an index position to identify a sector on the roller.

6. The method of claim 1, the modification of the image data further comprising:

computing a ratio of the image data for the media on which the test strip is printed to the image data for the blank media.

7. An inkjet printing system comprising:

a rotating member;

an optical imaging system positioned with respect to the rotating member to generate images of media as the media travels over the rotating member; and a controller coupled to the optical imaging system and configured to operate the optical imaging system to generate multiple images of blank media for each interval of the rotating member as the blank media travels over the rotating member, to compute a mean average image of the multiple images for each interval of the rotating member, to generate image data of printed media as the printed media travels over the rotating member, and to modify the image data of the printed media with the mean average image of the multiple images for the blank media that traveled over the interval of the rotating member when the blank media was illuminated.

8. The inkjet printing system of claim 7, wherein the roller has a white surface.

9. The inkjet printing system of claim 7, the rotating member further comprising:

indicia positioned at intervals on a circumference of the rotating member, the indicia being within a field of view of the optical imaging system as media travels over the rotating member.

10. The inkjet printing system of claim 7, the controller being further configured to modify the printed image data by computing a ratio of the image data of the printed media to the image data of the blank media.

11. The inkjet printing system of claim 7, the optical imaging system further comprising:

a light generator for illuminating the media as the media travels over the rotating member; and an array of photodetectors for generating electrical signals in response to light reflected by the illuminated media.

12. The inkjet printing system of claim 7, the controller being further configured to modify the image data of the printed media by computing a ratio of the image data of the printed media to the mean average image data of the multiple images of the blank media for the interval of the rotating member underneath the printed media when the printed media was illuminated.

13. A method for imaging media in a printing system comprising:

generating mean average image data of blank media for each sector of a rotating member in a printing system from light reflected by the blank media as the blank media moves over the rotating member;

printing a test strip on media;

generating image data of the test strip on the media as the media with the test strip moves over the rotating member;

identifying a sector of the rotating member underlying the test strip as the media with the test strip moves over the rotating member;

modifying the image data of the test strip on the media with the mean average image data for the identified sector; and storing the modified image data of the media with the test strip in memory.

14. The method of claim 13, the mean average image generation further comprising:

generating image data of the blank media for each sector of the roller;

computing a mean average image data for each sector from the image data of the blank media for each sector; and storing the mean average image data in memory in association with a sector identifier.

15. The method of claim 13, the sector identification further comprising:

detecting indicia positioned at intervals on the rotating member.

16. The method of claim 13, the sector identification further comprising:

receiving an encoder signal from a rotary encoder coupled to the rotating member; and decoding the encoder signal with reference to an index position to identify a sector on the rotating member.

17. The method of claim 13, the modification of the image data for the test strip on the media further comprising:

retrieving the mean average image data for the identified sector; and computing a ratio of the image data for the test strip on the media to the retrieved mean average image data.

18. The method of claim 13, further comprising:

identifying portions of multiple sectors underlying the test strip as the test strip moves over the rotating member;

retrieving mean average data for the identified sector portions; and modifying the image data of the test strip on the media with the retrieved mean average data for the identified sector portions.

* * * * *